US012637556B2

(12) United States Patent
Grazzi et al.

(10) Patent No.: US 12,637,556 B2
(45) Date of Patent: May 26, 2026

(54) ULTRASOFT POLYOLEFIN COMPOSITION

(71) Applicant: Basell Poliolefine Italia S.r.l., Milan (IT)

(72) Inventors: Michele Grazzi, Ferrara (IT); Monica Galvan, Ferrara (IT); Gisella Biondini, Ferrara (IT); Marco Ciarafoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 569 days.

(21) Appl. No.: 18/265,813

(22) PCT Filed: Nov. 25, 2021

(86) PCT No.: PCT/EP2021/082904

§ 371 (c)(1),
(2) Date: Jun. 7, 2023

(87) PCT Pub. No.: WO2022/128379

PCT Pub. Date: Jun. 23, 2022

(65) Prior Publication Data

US 2024/0059885 A1 Feb. 22, 2024

(30) Foreign Application Priority Data

Dec. 14, 2020 (EP) .................................... 20213683

(51) Int. Cl.
*C08L 23/14* (2006.01)
*C08J 5/18* (2006.01)

(52) U.S. Cl.
CPC ................. *C08L 23/14* (2013.01); *C08J 5/18* (2013.01); *C08J 2323/14* (2013.01); *C08L 2205/025* (2013.01); *C08L 2205/03* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 7,388,061 B2 | 6/2008 | Gao et al. | |
| 9,290,648 B2 | 3/2016 | Goberti et al. | |
| 9,434,827 B2 | 9/2016 | Frei et al. | |
| 9,932,469 B2 | 4/2018 | Wang et al. | |
| 10,669,414 B2 | 6/2020 | Li et al. | |
| 10,800,910 B2 * | 10/2020 | Gahleitner | C08L 23/14 |
| 11,053,380 B2 * | 7/2021 | Shutov | C08F 210/06 |
| 2005/0222314 A1 | 10/2005 | Credali et al. | |

FOREIGN PATENT DOCUMENTS

| | | | |
|---|---|---|---|
| EP | 45977 | A2 | 2/1982 |
| EP | 361493 | A1 | 4/1990 |
| EP | 395083 | A2 | 10/1990 |
| EP | 472946 | A2 | 3/1992 |
| EP | 728769 | A1 | 8/1996 |
| WO | 9837144 | A1 | 8/1998 |
| WO | 9844009 | A1 | 10/1998 |
| WO | 98056830 | A2 | 12/1998 |
| WO | 98056833 | A1 | 12/1998 |
| WO | 98056834 | A1 | 12/1998 |
| WO | 0055215 | A1 | 9/2000 |
| WO | 0063261 | A1 | 10/2000 |
| WO | 02100904 | A1 | 12/2002 |
| WO | 03011962 | A1 | 2/2003 |
| WO | 03076509 | A1 | 9/2003 |
| WO | 0757160 | A2 | 5/2007 |
| WO | 2009080485 | A1 | 7/2009 |
| WO | 2010078494 | A2 | 7/2010 |
| WO | 2011061134 | A1 | 5/2011 |
| WO | 2015055433 | A1 | 4/2015 |

OTHER PUBLICATIONS

The International Search Report and The Written Opinion for PCT/EP2021/082904 mailed Feb. 4, 2022.

* cited by examiner

*Primary Examiner* — Fred M Teskin

(57) ABSTRACT

A polyolefin composition made from or containing:
(I) 50-95% by weight of a heterophasic polyolefin composition made from or containing:
(A) 10-40% by weight of a propylene polymer selected from the group consisting of propylene homopolymers and copolymers of propylene with an alpha-olefin, having 1.0-6.0% by weight of units deriving from the alpha-olefin, wherein the propylene polymer (A) having a melt flow rate ($MFR_A$) ranging from 20 to 60 g/10 min.; and
(B) 60-90% by weight of a copolymer of propylene with an alpha-olefin, having 20-35% by weight of units deriving from the alpha-olefin,
wherein the fraction of the heterophasic polyolefin composition (I) soluble in xylene at 25° C. (XS(I)) is equal to or higher than 60% by weight; and
(II) 5-50% by weight of a propylene-ethylene copolymer having 12-25% by weight of units deriving from ethylene.

13 Claims, No Drawings

ULTRASOFT POLYOLEFIN COMPOSITION

This application is the U.S. National Phase of PCT International Application PCT/EP2021/082904, filed Nov. 25, 2021, claiming benefit of priority to European Patent Application No. 20213683.4, filed Dec. 14, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a thermoplastic polyolefin composition and sheets or membranes made therefrom

BACKGROUND OF THE INVENTION

In some instances, elastomers and thermoplastic polyolefins are used to produce sheets and membranes for roofing or as geomembranes.

Polyvinyl chloride (PVC) and other chlorinated thermoplastic polyolefins (TPOs) were used to prepare heat-weldable thermoplastic roofing sheets. However, PVC used plasticizers to provide flexibility for roofing applications. The aging of membranes through the loss of plasticizers and the presence of chlorine in the polymer chains were the drivers for the substitution of PVC with chlorine-free thermoplastic polyolefins, which provided mechanical properties in absence of plasticizers.

In some instances, heterophasic polyolefin compositions are used to prepare sheets or membranes for roofing applications, providing that the compositions are heat-weldable, flexible, and recyclable.

In some instances, blends of heterophasic polyolefin compositions and elastomers are used in roofing applications. In some instances, the elastomers are polyolefin-based elastomers.

SUMMARY OF THE INVENTION

In a general embodiment, the present disclosure provides a polyolefin composition made from or containing:

(I) 50-95% by weight of a heterophasic polyolefin composition made from or containing:

(A) 10-40% by weight of a propylene polymer selected from the group consisting of propylene homopolymers and copolymers of propylene with an alpha-olefin of formula $CH_2{=}CHR$, where R is H or a linear or branched C2-C8 alkyl, and having 1.0-6.0% by weight of units deriving from the alpha-olefin, based on the weight of the propylene polymer (A), wherein the propylene polymer (A) having a melt flow rate ($MFR_A$) measured according to ISO 1133, 230° C., 2.16 kg ranging from 20 to 60 g/10 min.; and (B) 60-90% by weight of a copolymer of propylene with an alpha-olefin of formula $CH_2{=}CHR$, and optionally a diene, where R is H or a linear or branched C2-C8 alkyl, and having 20-35% by weight of units deriving from the alpha-olefin, based on the weight of the propylene copolymer (B), wherein the fraction of the heterophasic polyolefin composition (I) soluble in xylene at 25° C. (XS(I)) is equal to or higher than 60% by weight, the amounts of (A), (B) and XS(I) being based on the total weight of (A)+(B);

and (II) 5-50% by weight of a propylene-ethylene copolymer having 12-25% by weight of units deriving from ethylene, based on the weight of the propylene-ethylene copolymer (II), wherein the amounts of (I) and (II) are based on the total weight of (I)+(II).

In some embodiments, the present disclosure provides a method for preparing a heterophasic polyolefin composition made from or containing a propylene polymer matrix (A) and an elastomeric component (B), including the step of adding 5-50% by weight, based on the final polyolefin composition, of a propylene-ethylene copolymer having 12-25% by weight of units deriving from ethylene, based on the weight of the propylene-ethylene copolymer, to the heterophasic polyolefin composition. In some embodiments, the adding step includes melt blending the heterophasic polyolefin composition and the propylene-ethylene copolymer.

In some embodiments, the present disclosure provides a sheet or membrane made from or containing a polyolefin composition made from or containing:

(I) 50-95% by weight of a heterophasic polyolefin composition made from or containing:

(A) 10-40% by weight of a propylene polymer selected from the group consisting of propylene homopolymers and copolymers of propylene with an alpha-olefin of formula CH2=CHR, where R is H or a linear or branched C2-C8 alkyl, and having 1.0-6.0% by weight of units deriving from the alpha-olefin, based on the weight of the propylene polymer (A), wherein the propylene polymer (A) having a melt flow rate ($MFR_A$) measured according to ISO 1133, 230° C., 2.16 kg ranging from 20 to 60 g/10 min.; and (B) 60-90% by weight of a copolymer of propylene with an alpha-olefin of formula CH2=CHR, and optionally a diene, where R is H or a linear or branched C2-C8 alkyl, and having 20-35% by weight of units deriving from the alpha-olefin, based on the weight of the propylene copolymer (B), wherein the fraction of the heterophasic polyolefin composition (I) soluble in xylene at 25° C. (XS(I)) is equal to or higher than 60% by weight, the amounts of (A), (B) and XS(I) being based on the total weight of (A)+(B);

and (II) 5-50% by weight of a propylene-ethylene copolymer having 12-25% by weight of units deriving from ethylene, based on the weight of the propylene-ethylene copolymer (II), wherein the amounts of (I) and (II) are based on the total weight of (I)+(II).

In some embodiments, the present disclosure provides sheets or membranes made from or containing the polyolefin composition.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the following detailed description is to be regarded as illustrative in nature and not restrictive.

DETAILED DESCRIPTION OF THE INVENTION

In the present description and in the appended claims, the percentages are expressed by weight, unless otherwise specified.

In the context of the present description and of the appended claims, when the term "comprising" is referred to a polymer or to a polyolefin composition, the term should be construed to mean "comprising or consisting essentially of".

In the context of the present disclosure, the term "consisting essentially of" means that, in addition to the specified components, the polymer or the polyolefin composition may be made from or containing other components, provided that the essential characteristics of the polymer or of the composition are not materially affected by the presence of the other components. In some embodiments, the other components are selected from the group consisting of catalyst residues, antistatic agents, melt stabilizers, light stabilizers, antioxidants, and antiacids.

In some embodiments, the heterophasic polyolefin composition (I) is made from or containing 15-35% by weight, alternatively 20-30% by weight, of propylene polymer (A) and 65-85% by weight, alternatively 70-80% by weight, of propylene copolymer (B), wherein the amounts of (A) and (B) being based on the total weight of (A)+(B).

In some embodiments, the propylene polymer (A) is a propylene copolymer has 1.0-6.0% by weight, alternatively 2.0-5.0% by weight, alternatively 2.8-4.8% by weight, alternatively 3.0-4.0% by weight, of units deriving from an alpha-olefin of formula $CH_2{=}CHR$, where R is H or a linear or branched C2-C8 alkyl, based on the weight of the propylene polymer (A).

In some embodiments, the alpha-olefin of propylene polymer (A) is selected from the group consisting of ethylene, butene-1, hexene-1, 4-methy-pentene-1, octene-1, and combinations thereof.

In some embodiments, the propylene polymer (A) is a propylene copolymer with hexene-1 having 1.0-6.0% by weight, alternatively 2.0-5.0% by weight, alternatively 2.8-4.8% by weight, alternatively 3.0-4.0% by weight, of units deriving from hexene-1, based on the weight of the propylene polymer (A).

In some embodiments, the propylene polymer (A) is a propylene copolymer with ethylene having 2.0-4.0% by weight, alternatively 3.0-3.9% by weight, of units deriving from ethylene, based on the weight of the propylene polymer (A).

In some embodiments, the propylene polymer (A) has a melt flow rate ($MFR_A$) measured according to ISO 1133, 230° C., 2.16 kg ranging from 25 to 55 g/10 min., alternatively from 25 to 50 g/10 min.

In some embodiments, the propylene polymer (A) is a propylene copolymer with hexene-1 having a melt flow rate ($MFR_A$) measured according to ISO 1133, 230° C., 2.16 kg ranging from 25 to 55 g/10 min., alternatively from 25 to 50 g/10 min.

In some embodiments, the propylene polymer (A) is a propylene copolymer with ethylene having a melt flow rate ($MFR_A$) measured according to ISO 1133, 230° C., 2.16 kg ranging from 35 to 50 g/10 min., alternatively from 40 to 50 g/10 min., alternatively from 42 to 48 g/10 min.

In some embodiments, the propylene polymer (A) has an amount of fraction soluble in xylene at 25° C. ($XS_A$) lower than 12.0% by weight, alternatively lower than 9.0% by weight; alternatively in the range 5.0-12.0% by weight, alternatively 6.0-9.0% by weight, alternatively 6.0-8.0% by weight, based on the weight of the propylene polymer (A). In some embodiments, the propylene polymer (A) is a propylene copolymer.

In some embodiments, the propylene copolymer (B) has from 25 to 35% by weight of units deriving from the alpha-olefin, based on the weight of copolymer (B).

In some embodiments, the propylene copolymer (B) has a molecular weight distribution Mw/Mn(B) greater than 3.5, alternatively ranging from greater than 3.5 to 8.0.

In some embodiments, the propylene copolymer (B) has an amount of fraction soluble in xylene at 25° C. ($XS_B$) higher than 80% by weight, alternatively higher than 85% by weight, alternatively higher than 90% by weight, based on the total weight of the propylene copolymer (B).

In some embodiments, the upper limit of the amount of the fraction of propylene polymer (B) that is soluble in xylene at 25° C. ($XS_B$) is 97% by weight for each lower limit, based on the total weight of the propylene copolymer (B).

In some embodiments, the propylene copolymer (B) is made from or containing a first copolymer (B1) and a second copolymer (B2) of propylene with an alpha-olefin of formula $CH_2{=}CHR$, and optionally a diene, where R is H or a linear or branched C2-C8 alkyl, provided that the total amount of alpha-olefin in the propylene copolymer (B) is 20-35% by weight, alternatively from 25 to 35% by weight, based on the total weight of propylene copolymer (B).

In some embodiments, the propylene copolymer (B) is made from or containing:

(B1) 30-60% by weight, alternatively 40-55% by weight, of a first copolymer of propylene with an alpha-olefin of formula $CH_2{=}CHR$, and optionally a diene, where R is H or a linear or branched C2-C8 alkyl, having 20-40% by weight, alternatively 25-35% by weight, of alpha-olefin and a fraction soluble in xylene at 25° C. ($XS_{B1}$) higher than 80% by weight, alternatively higher than 85% by weight, alternatively higher than 90% by weight, wherein the amount of alpha-olefin and of $XS_{B1}$ are based on the weight of component (B1); and (B2) 40-70% by weight, alternatively 45-60% by weight, of a second copolymer of propylene with an alpha-olefin of formula $CH_2{=}CHR$, and optionally a diene, where R is H or a linear or branched C2-C8 alkyl, having 25-45% by weight, alternatively 30-43% by weight, of alpha-olefin and a fraction soluble in xylene at 25° C. ($XS_{B2}$) higher than 80% by weight, alternatively higher than 85% by weight, alternatively higher than 90% by weight, wherein the amount of alpha-olefin and of $XS_{B2}$ are based on the weight of component (B2), wherein the amounts of (B1) and (B2) are based on the total weight of the propylene copolymer (B), provided that the total amount of alpha-olefin in the propylene copolymer (B) is 20-35% by weight, alternatively from 25 to 35% by weight, based on the total weight of propylene copolymer (B).

In some embodiments, the upper limit of the amount of the fraction of component (B1) or of component (B2), which is soluble in xylene at 25° C. ($XS_{B1}$ or $XS_{B2}$), is 97% by weight for each lower limit, wherein the amounts of $XS_{B1}$ and $XS_{B2}$ being based on the weight of component (B1) and (B2) respectively.

In some embodiments, the upper limit of $XS_{B1}$ and of $XS_{B2}$ is 97% by weight for each lower limit, the amounts of $XS_{B1}$ and $XS_{B2}$ being based on the weight of component (B1) and (B2) respectively.

In some embodiments, the alpha-olefin of propylene copolymer (B), component (B1), or component (B2) is independently selected from the group consisting of ethylene, butene-1, hexene-1, 4-methy-pentene-1, octene-1, and combinations thereof. In some embodiments, the alpha-olefin is ethylene.

In some embodiments, the propylene copolymer (B), component (B1), or component (B2) has recurring units derived from a diene. In some embodiments, the diene is independently selected from the group consisting of butadiene, 1,4-hexadiene, 1,5-hexadiene, ethylidene-1-norbonene, and combinations thereof.

In some embodiments, the total amount of recurring units deriving from a diene in the propylene copolymer (B) ranges from 1 to 10% by weight, based on the weight of the propylene copolymer (B).

In some embodiments, the fraction of the heterophasic polyolefin composition (I) soluble in xylene at 25° C. (XS(I)) is higher than 65% by weight, alternatively higher that 70% by weight, alternatively ranging from 71 to 90% by weight, alternatively ranging from 72 to 80% by weight, based on the total weight of (A)+(B).

In some embodiments, the fraction soluble in xylene at 25° C. of the heterophasic polyolefin composition (I) has an intrinsic viscosity XSIV(I) ranging from 2.0 to 5.5 dl/g, alternatively 2.5 to 4.5 dl/g, alternatively from 3.1 to 3.9 dl/g.

In some embodiments, the heterophasic polyolefin composition (I) has a melt flow rate MFR(I) measured according to ISO 1133, 230° C., 2.16 kg ranging from 0.2 to 6.0 g/10 min., alternatively from 0.2 to 2.0 g/10 min., alternatively from 0.2 to 1.5 g/10 min., alternatively from 0.25 to 1.00 g/10 min.

In some embodiments, the melt flow rate MFR(I) of the heterophasic polyolefin composition (I) ranges from 0.2 to 6.0 g/10 min., alternatively from 0.2 to 2.0 g/10 min., alternatively from 0.2 to 1.5 g/10 min., alternatively from 0.25 to 1.00 g/10 min., and is measured according to ISO 1133, 230° C., 2.16 kg on the heterophasic polyolefin composition (I) obtained directly from polymerization.

In some embodiments, the melt flow rate MFR(I) of the heterophasic polyolefin composition (I) measured according to ISO 1133, 230° C., 2.16 kg ranging from 0.2 to 6.0 g/10 min., alternatively from 0.2 to 2.0 g/10 min., alternatively from 0.2 to 1.5 g/10 min., alternatively from 0.25 to 1.00 g/10 min., is not obtained by degrading (visbreaking) the heterophasic polyolefin composition (I) obtained from the polymerization reaction.

In some embodiments, the heterophasic polyolefin composition (I) is made from or containing:

(A) 10-40% by weight, alternatively 15-35% by weight, alternatively 20-30% by weight, of a copolymer of propylene with hexene-1, having 1.0-6.0% by weight, alternatively 2.0-5.0% by weight, alternatively 2.8-4.8% by weight, alternatively 3.0-4.0% by weight, of hexene-1, based on the weight of (A), and a melt flow rate ($MFR_A$) measured according to ISO 1133, 230° C., 2.16 kg ranging from 20 to 60 g/10 min., alternatively from 25 to 55 g/10 min., alternatively from 25 to 50 g/10 min.; and (B) 60-90% by weight, alternatively 65-85% by weight, alternatively 70-80% by weight, of a copolymer of propylene with ethylene, having 20-35% by weight of ethylene, alternatively 25-35% by weight, based on the total weight of (B), wherein i) the fraction of the heterophasic polyolefin composition (I) soluble in xylene at 25° C. XS(I) is higher than 60% by weight, alternatively higher than 65% by weight, alternatively higher than 70% by weight, alternatively ranges from 71 to 90% by weight, alternatively ranges from 72 to 80% by weight, and the amounts of (A) and (B) and XS(I) are based on the total weight of (A)+(B); and ii) the melt flow rate (MFR(I)) of the heterophasic polyolefin composition (I) measured according to ISO 1133, 230° C., 2.16 kg ranges from 0.2 to 6.0 g/10 min., alternatively from 0.2 to 2.0 g/10 min., alternatively from 0.2 to 1.5 g/10 min., alternatively from 0.25 to 1.00 g/10 min.

In some embodiments, the heterophasic polyolefin composition (I) is made from or containing:

(A) 18-35% by weight, alternatively 20-30% by weight, of a copolymer of propylene with ethylene having 2.0-4.0% by weight, alternatively 3.0-3.9% by weight, of ethylene, based on the weight of (A), and a melt flow rate ($MFR_A$) measured according to ISO 1133, 230° C., 2.16 kg ranging from 30 to 60 g/10 min., alternatively from 35 to 50 g/10 min., alternatively from 40 to 50 g/10 min., alternatively from 42 to 48 g/10 min; and (B) 65-82% by weight, alternatively 70-80% by weight, of a copolymer of propylene with ethylene having 20-35% by weight, alternatively 25-35% by weight, of ethylene, based on the weight of (B), wherein i) the fraction of the heterophasic polyolefin composition (I) soluble in xylene at 25° C. XS(I) is higher than 70% by weight, alternatively ranging from 70 to 90% by weight, alternatively from 70 to 80% by weight, ii) the amounts of (A), (B) and of the fraction soluble in xylene at 25° C. XS(I) are based on the total weight of (A)+(B);

iii) the melt flow rate MFR(I) measured according to ISO 1133, 230° C., 2.16 kg of the heterophasic polyolefin composition (I) ranges from 0.2 to 2.0 g/10 min., alternatively from 0.3 to 1.5 g/10 min., alternatively from 0.4 to 1.0 g/10 min., the value of MFR(I) being measured on the heterophasic polyolefin composition (I) obtained directly from polymerization; and iv) the fraction soluble in xylene at 25° C. of the polyolefin composition has an intrinsic viscosity XSIV(I) ranging from 2.5 to 4.5 dl/g, alternatively from 3.0 to 3.9 dl/g.

In some embodiments, the heterophasic polyolefin composition (I) has at least one of the following properties measured on injection molded specimens:

Flexural Modulus ranging from 50 to 90 MPa, alternatively from 60 to 85 MPa, alternatively from 65 to 80 MPa, measured according to ISO 178:2019; or Strength at break greater than or equal to 9.0 MPa, measured according to the method ISO 527; or Elongation at break, determined according to the method ISO 527, in the range 350-550%; or Vicat softening temperature, determined according to the method ISO 306 (A50), in the range 40°-60° C.; or Charpy resistance at −40° C. equal to or higher than 6.0 $KJ/m^2$, measured according to ISO 179/1eA 2010; or Shore A value, determined according to the method ISO 868 (15 sec), in the range 70-90; or Shore D value, determined according to the method ISO 868 (15 sec), in the range 23-30. In some embodiments, the strength at break is in the range 9.0-15.0 MPa, alternatively 10.0-15.0 MPa, alternatively 11.0-15.0

MPa. In some embodiments, the Charpy resistance at $-40°$ C. is in the range 6.0-10.0 $KJ/m^2$.

In some embodiments, the heterophasic polyolefin composition (I) has at least one of the following properties, measured on 1 mm-thick extruded sheets:

tensile modulus lower than 70.0 MPa, alternatively lower than 60.0 MPa, alternatively lower than 50 MPa in MD or TD, alternatively in MD and TD, determined according to the method ISO 527-3 (specimens type 2, Crosshead speed: 1 mm/min); or strength at break greater than 14.0 MPa, alternatively greater than 15.0 MPa, in MD or TD, alternatively in MD and TD, determined according to the method ISO527-3 (Specimens type: 5, Crosshead speed: 500 mm/min); or elongation at break in MD or TD, alternatively in MD and TD, determined according to the method ISO527-3 (Specimens type: 5, Crosshead speed: 500 mm/min), in the range 600-800%; or tear resistance in MD or TD, alternatively in MD and TD, determined according to the method ASTM D 1004 (Crosshead speed: 51 mm/min; V-shaped die cut specimen), in the range 40-70 N, alternatively 50-65 N; or puncture deformation greater than or equal to 40 mm, alternatively greater than or equal to 45 mm, measured according to method ASTM D 4833 (punch diameter: 8 mm, crosshead speed: 300 mm/min); or puncture resistance greater than 170 N, alternatively greater than 200 N, measured according to method ASTM D 4833 (punch diameter: 8 mm, crosshead speed: 300 mm/min); or Shore A value lower than 90, measured according to method ISO 868 (15 sec); or Shore D value equal to or lower than 30, measured according to method ISO 868 (15 sec). In some embodiments, the tensile modulus in MD or TD, alternatively in MD and TD, is in the range 30.0-70.0 MPa, alternatively 30.0-60.0 MPa. In some embodiments, the strength at break in MD or TD, alternatively in MD and TD, is in the range 14.0-20.0 MPa, alternatively 15.0-18.0 MPa. In some embodiments, the puncture deformation is in the range 40-60 mm, alternatively 45-60 mm.

In some embodiments, the puncture resistance is in the range 170-250 N, alternatively 200-250 N. In some embodiments, the Shore A value is in the range 70-90. In some embodiments, the Shore D value is in the range 23-30.

In some embodiments, the heterophasic polyolefin composition (I) has the properties described above measured on injection molded and extruded sheets.

In some embodiments, the heterophasic polyolefin composition (I) is a melt blend or a reactor blend of (A) and (B).

In some embodiments, the heterophasic polyolefin composition (I) is a reactor blend prepared by sequential polymerization in at least two stages, wherein the second and each subsequent polymerization stage is carried out in the presence of the polymer produced in the immediately preceding polymerization stage.

In some embodiments, the polymerization processes to prepare the single components (A) and (B) or the sequential polymerization process to prepare the heterophasic polyolefin composition (I) are carried out in the presence of a catalyst selected from the group consisting of metallocene compounds, stereospecific Ziegler-Natta catalyst systems, and combinations thereof.

In some embodiments, the polymerization processes to prepare the single components (A) and (B) or the sequential polymerization process to prepare the heterophasic polyolefin composition (I) are carried out in the presence of a stereospecific Ziegler-Natta catalyst system made from or containing:

(1) a solid catalyst component made from or containing a magnesium halide support on which a Ti compound having a Ti-halogen bond is present, and a stereoregulating internal donor;

(2) optionally, an Al-containing cocatalyst; and (3) optionally, a further electron-donor compound (external donor).

In some embodiments, the solid catalyst component (1) is made from or containing a titanium compound of formula $Ti(OR)_nX_{y\_n}$, wherein n is between 0 and y; y is the valence of titanium; X is halogen and R is a hydrocarbon group having 1-10 carbon atoms or a —COR group. In some embodiments, titanium compounds having a Ti-halogen bond is selected from the group consisting of titanium tetrahalides and titanium halogenalcoholates. In some embodiments, the titanium compounds are selected from the group consisting of $TiCl_3$, $TiCl_4$, $Ti(OBu)_4$, $Ti(OBu)Cl_3$, $Ti(OBu)_2Cl_2$, and $Ti(OBu)_3Cl$. In some embodiments, the titanium compounds are $TiCl_4$.

In some embodiments, the solid catalyst component (1) is made from or containing a titanium compound in an amount providing from 0.5 to 10% by weight of Ti with respect to the total weight of the solid catalyst component (1).

In some embodiments, the solid catalyst component (1) is made from or containing a stereoregulating internal electron donor compound selected from mono or bidentate organic Lewis bases. In some embodiments, the solid catalyst component (1) is made from or containing a stereoregulating internal electron donor compound selected from the group consisting of esters, ketones, amines, amides, carbamates, carbonates, ethers, nitriles, alkoxysilanes, and combinations thereof.

In some embodiments, the electron donors are selected from the group consisting of aliphatic or aromatic mono- or dicarboxylic acid esters and diethers.

In some embodiments, the alkyl and aryl esters of optionally substituted aromatic polycarboxylic acids are selected from the group consisting of esters of phthalic acids. In some embodiments, the esters of phthalic acids are as described in European Patent Application Nos. EP45977A2 and EP395083A2.

In some embodiments, the internal donor is selected from the group consisting of mono- or di-substituted phthalates, wherein the substituents are independently selected from the group consisting of linear or branched $C_{1-10}$ alkyl, $C_{3-8}$ cycloalkyl, and aryl radicals.

In some embodiments, the internal donor is selected from the group consisting of di-isobutyl phthalate, di-n-butyl phthalate, di-n-octyl phthalate, diphenyl phthalate, benzylbutyl phthalate, and combinations thereof. In some embodiments, the internal donor is di-isobutyl phthalate.

In some embodiments, the esters of aliphatic acids are selected from the group consisting of esters of malonic acids, esters of glutaric acids, and esters of succinic acids. In some embodiments, the esters of malonic acids are as described in Patent Cooperation Treaty Publication Nos. WO98/056830, WO98/056833, and WO98/056834. In some embodiments, the esters of glutaric acids are as described in Patent Cooperation Treaty Publication No. WO00/55215. In some embodiments, the esters of succinic acids are as described in Patent Cooperation Treaty Publication No. WO00/63261.

In some embodiments, the diesters are derived from esterification of aliphatic or aromatic diols. In some embodiments, the diesters are as described in Patent Cooperation Treaty Publication No. WO2010/078494 and U.S. Pat. No. 7,388,061.

In some embodiments, the internal donor is selected from 1,3-diethers of formula (I)

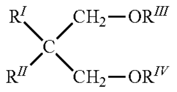

wherein $R^I$ and $R^{II}$ are independently selected from $C_{1-18}$ alkyl, $C_{3-18}$ cycloalkyl, and $C_{7-18}$ aryl radicals, $R^{III}$ and $R^{IV}$ are independently selected from $C_{1-4}$ alkyl radicals; or the carbon atom in position 2 of the 1,3-diether belongs to a cyclic or polycyclic structure made up of from 5 to 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, wherein the structure containing two or three unsaturations (cyclopolyenic structures), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more, wherein one or more of the alkyl, cycloalkyl, aryl, aralkyl, or alkaryl radicals and the condensed cyclic structures optionally contain one or more heteroatom(s) as substitutes for carbon and/or hydrogen atoms. In some embodiments, the substituents are bonded to the condensed cyclic structures. In some embodiments, the ethers are as described in European Patent Application Nos. EP361493 and EP728769 and Patent Cooperation Treaty Publication No. WO02/100904.

In some embodiments, 1,3-diethers are used and the external electron donor (3) is absent.

In some embodiments, mixtures of internal donors are used. In some embodiments, the mixtures are between aliphatic or aromatic mono or dicarboxylic acid esters and 1,3-diethers as described in Patent Cooperation Treaty Publication Nos. WO07/57160 and WO2011/061134.

In some embodiments, the magnesium halide support is magnesium dihalide.

In some embodiments, the amount of internal donor which remains fixed on the solid catalyst component (1) is 5 to 20% by moles, with respect to the magnesium dihalide.

In some embodiments, the preparation of the solid catalyst components involves a reaction of Mg dihalide precursors with titanium chlorides to form the Mg dihalide support. In some embodiments, the reaction is carried out in the presence of the stereoregulating internal donor.

In some embodiments, the magnesium dihalide precursor is a Lewis adduct of formula $MgCl_2 \cdot nR1OH$, where n is a number between 0.1 and 6, and R1 is a hydrocarbon radical having 1-18 carbon atoms. In some embodiments, n ranges from 1 to 5, alternatively from 1.5 to 4.5.

In some embodiments, the adduct is prepared by mixing alcohol and magnesium chloride, operating under stirring conditions at the melting temperature of the adduct (100-130° C.).

Then, the adduct is mixed with an inert hydrocarbon immiscible with the adduct, thereby creating an emulsion which is quickly quenched causing the solidification of the adduct in the form of spherical particles.

In some embodiments, the resulting adduct is directly reacted with the Ti compound or subjected to thermal controlled dealcoholation (80-130° C.), thereby obtaining an adduct wherein the number of moles of alcohol is lower than 3, alternatively between 0.1 and 2.5.

In some embodiments, this controlled dealcoholation step is carried out to increase the morphological stability of the catalyst during polymerization or to increase the catalyst porosity as described in European Patent Application No. EP395083A2.

In some embodiments, the reaction with the Ti compound is carried out by suspending the optionally dealcoholated adduct in cold $TiCl_4$. In some embodiment, cold $TiCl_4$ is at 0° C. In some embodiments, the mixture is heated up to 80-130° C. and kept at this temperature for 0.5-2 hours. In some embodiments, the treatment with $TiCl_4$ is carried out one or more times. In some embodiments, the stereoregulating internal donor is added during the treatment with $TiCl_4$. In some embodiments, the treatment with the internal donor is repeated one or more times.

In some embodiments, the preparation of catalyst components is as described in U.S. Pat. Nos. 4,399,054 and 4,469,648, Patent Cooperation Treaty Publication No. WO98/44009A1, and European Patent Application No. EP395083A2.

In some embodiments, the catalyst component (1) is in the form of spherical particles having an average diameter ranging from 10 to 350 μm, a surface area ranging from 20 to 250 $m^2/g$, alternatively from 80 to 200 $m^2/g$, and a porosity greater that 0.2 ml/g, alternatively of from 0.25 to 0.5 ml/g, wherein the surface area and the porosity are measured by BET.

In some embodiments, the catalyst system is made from or containing an Al-containing cocatalyst (2). In some embodiments, the Al-containing cocatalyst (2) is selected from the group consisting of Al-trialkyls, alternatively the group consisting of Al-triethyl, Al-triisobutyl, and Al-tri-n-butyl.

In some embodiments, the Al/Ti weight ratio in the catalyst system is from 1 to 1000, alternatively from 20 to 800.

In some embodiments, the catalyst system is further made from or containing electron donor compound (3) (external electron donor). In some embodiments, the external electron donor is selected from the group consisting of silicon compounds, ethers, esters, amines, heterocyclic compounds, and ketones. In some embodiments, the heterocyclic compound is 2,2,6,6-tetramethylpiperidine.

In some embodiments, the external donor is selected from the group consisting of silicon compounds of formula (R2) a(R3)bSi(OR4)c, where a and b are integers from 0 to 2, c is an integer from 1 to 4, and the sum (a+b+c) is 4; R2, R3, and R4 are alkyl, cycloalkyl or aryl radicals with 1-18 carbon atoms, optionally containing heteroatoms. In some embodiments, a is 1, b is 1, c is 2, at least one of R2 and R3 is selected from branched alkyl, cycloalkyl or aryl groups with 3-10 carbon atoms, optionally containing heteroatoms, and R4 is a C1-C10 alkyl group. In some embodiments, R4 is a methyl group.

In some embodiments, the silicon compounds are selected from the group consisting of methylcyclohexyldimethoxysilane (C-donor), diphenyldimethoxysilane, methyl-t-butyldimethoxysilane, dicyclopentyldimethoxysilane (D-donor), diisopropyldimethoxysilane, (2-ethylpiperidinyl)t-butyldimethoxy silane, (2-ethylpiperidinyl)thexyldimethoxysilane, (3,3,3-trifluoro-n-propyl)(2-ethylpiperidinyl)dimethoxy silane, methyl(3,3,3-trifluoro-n-propyl)dimethoxysilane, and combinations thereof.

In some embodiments, the silicon compounds are wherein a is 0, c is 3, R3 is a branched alkyl or cycloalkyl group, optionally containing heteroatoms, and R4 is methyl. In some embodiments, the silicon compounds are selected from the group consisting of cyclohexyltrimethoxysilane, t-butyltrimethoxysilane, and hexyltrimethoxysilane.

In some embodiments, the catalyst system is made from or containing di-isobutyl phthalate as internal donor and dicyclopentyl dimethoxy silane (D-donor) as external electron donor (3).

In some embodiments, the catalyst system is pre-contacted with small quantities of olefin (prepolymerization), maintaining the catalyst in suspension in a hydrocarbon solvent, and polymerizing at temperatures from 25° to 60° C., thereby producing a quantity of polymer from about 0.5 to about 3 times the weight of the catalyst system.

In some embodiments, the prepolymerization is carried out in liquid monomer, thereby producing a quantity of polymer 1000 times the weight of the catalyst system.

In some embodiments, sequential polymerization processes for preparing the polyolefin compositions are as described in European Patent Application No. EP472946 and Patent Cooperation Treaty Publication No. WO03/011962, which content is incorporated in this patent application.

In some embodiments, components (A) and (B) are produced in any of the polymerization stages.

In some embodiments, the polymerization process includes polymerizations stages carried out in the presence of a stereospecific Ziegler-Natta catalyst system, wherein:

(a) in the first copolymerization stage, monomers are polymerized to form the propylene polymer (A); and
(b) in the second copolymerization stage, the relevant monomers are polymerized to form the propylene copolymer (B).

In some embodiments, the second copolymerization stage (b) includes a copolymerization stage (b1) and a copolymerization stage (b2), wherein the comonomers are polymerized to form propylene copolymer (B1) and propylene copolymer (B2). In some embodiments, the preparation of propylene copolymer (B1) and propylene copolymer (B2) is not order specific.

In some embodiments, the polymerization is continuous or batch. In some embodiments, the polymerization is carried out according to cascade techniques, operating either in mixed liquid phase/gas phase or totally in gas phase.

In some embodiments, the liquid-phase polymerization is in slurry, solution, or bulk (liquid monomer). In some embodiments, the liquid-phase polymerization is carried out in various types of reactors. In some embodiments, the reactors are continuous stirred tank reactors, loop reactors, or plug-flow reactors.

In some embodiments, the gas-phase polymerization stages are carried out in gas-phase reactors. In some embodiments, the gas-phase reactors are fluidized or stirred, fixed bed reactors.

In some embodiments, the copolymerization stage (a) is carried out in liquid phase using liquid propylene as diluent and the copolymerization stage (b), or the copolymerization stages (b1) and (b2), are carried out in the gas phase.

In some embodiments, the copolymerization stage (a) is carried out in the gas phase.

In some embodiments, the reaction temperatures of the polymerization stages (a), (b), (b1), and (b2) are independently selected from values in the range from 40° to 90° C.

In some embodiments, the polymerization pressure of the copolymerization stage (a) carried out in liquid phase is from 3.3 to 4.3 MPa.

In some embodiments, the polymerization pressure of the copolymerization stages (a), (b), (b1), and (b2) carried out in gas-phase is independently selected from values in the range from 0.5 to 3.0 MPa.

In some embodiments, the residence time of each polymerization stage depends upon the ratio of components (A) and (B), or of components (A), (B1), and (B2), of the polyolefin composition.

In some embodiments, the residence time in each polymerization stage ranges from 15 minutes to 8 hours.

In some embodiments, the polyolefin composition is prepared by a sequential polymerization process and the amounts of components (A) and (B), or of components (A), (B1), and (B2), correspond to the split between the polymerization reactors.

In some embodiments, the molecular weight of the propylene copolymers obtained in the polymerization stages is regulated using chain transfer agents. In some embodiments, the chain transfer agent is hydrogen or $ZnEt_2$.

In some embodiments, the propylene-ethylene copolymer (II) has 12-25% by weight, alternatively 15-20% by weight, of units deriving from ethylene, based on the weight of the propylene-ethylene copolymer (II).

In some embodiments, the propylene-ethylene copolymer (II) is a polyolefin elastomer (POE) having at least one of the following properties:

- a fraction soluble in xylene at 25° C. greater than 97% by weight, alternatively equal to or greater than 99% by weight, based on the weight of component (II); or
- an intrinsic viscosity XSIV(II) of the fraction soluble in xylene at 25° C. lower than 2.00 dl/g, alternatively ranging from 1.00 to 2.00 dl/g, alternatively from 1.10 to 1.80 dl/g; or
- a molecular weight distribution Mw/Mn from 1.5 to 3.5, alternatively from 1.8 to 3.0, alternatively from 2.0 to 2.8; or
- a density from 0.840 to 0.880 $g/cm^3$, alternatively from 0.850 to 0.870 $g/cm^3$, alternatively from 0.855 to 0.865 $g/cm^3$; or
- Shore A value lower than 90, alternatively lower than 50, measured on compression-molded plaques according to the method ISO 868.

In some embodiments, the propylene-ethylene copolymer (II) is a POE, having the properties indicated above.

In some embodiments, the propylene-ethylene copolymer (II) is prepared using homogeneous conditions. In some embodiments, the propylene-ethylene copolymer (II) is prepared using a solution polymerization process. In some embodiments, the propylene-ethylene copolymer (II) is prepared in the presence of a metallocene catalyst system.

In some embodiments, the propylene-ethylene copolymer (II) is a polyolefin elastomer commercially available under the tradename Vistamaxx from ExxonMobil or the tradename Notio from Mitsui Chemicals.

In some embodiments, the polyolefin composition is made from or containing 65-95% by weight, alternatively 75-93% by weight, of the heterophasic polyolefin composition (I) and 5-35% by weight, alternatively 7-25% by weight, of the propylene-ethylene copolymer (II), wherein the amounts of components (I) and (II) are based on the weight (I)+(II).

In some embodiments, the polyolefin composition is made from or containing:

(I) 50-95% by weight, alternatively 65-95% by weight, alternatively 75-93% by weight, of a heterophasic polyolefin composition made from or containing:

(A) 10-40% by weight, alternatively 15-35% by weight, alternatively 20-30% by weight, of a copolymer of propylene with hexene-1 having 1.0-6.0% by weight, alternatively 2.0-5.0% by weight, alternatively 2.8-4.8% by weight, alternatively 3.0-4.0% by weight, of hexene-1, based on the weight of the propylene polymer (A), and a melt flow rate ($MFR_A$) measured according to ISO 1133, 230° C., 2.16 kg ranging from 20 to 60 g/10 min., alternatively from 25 to 55 g/10 min., alternatively from 25 to 50 g/10 min.; and (B) 60-90% by weight, alternatively 65-85% by weight, alternatively 70-80% by weight, of a copolymer of propylene with ethylene having 20-35% by weight of ethylene, alternatively 25-35% by weight, based on the total weight of the propylene copolymer (B), wherein i) the fraction of the heterophasic polyolefin composition (I) soluble in xylene at 25° C. XS(I) is higher than 60% by weight, alternatively higher than 65% by weight, alternatively higher than 70% by weight, alternatively ranges from 71 to 90% by weight, alternatively ranges from 72 to 80% by weight;

ii) the amounts of (A) and (B) and XS(I) are based on the total weight of (A)+(B); and iii) the melt flow rate (WWI)) of the heterophasic polyolefin composition (I) measured according to ISO 1133, 230° C., 2.16 kg ranges from 0.2 to 6.0 g/10 min., alternatively from 0.2 to 2.0 g/10 min., alternatively from 0.2 to 1.5 g/10 min., alternatively from 0.25 to 1.00 g/10 min, and (II) 5-50% by weight, alternatively 5-35% by weight, alternatively 7-25% by weight, of a propylene-ethylene copolymer having 12-25% by weight, alternatively 15-20% by weight, of units deriving from ethylene, based on the weight of the propylene-ethylene copolymer (II), wherein the propylene-ethylene copolymer has:

iv) a fraction soluble in xylene at 25° C. greater than 97% by weight, alternatively equal to or greater than 99% by weight, based on the weight of component (II); or v) the fraction soluble in xylene at 25° C. has an intrinsic viscosity XSIV(II) lower than 2.00 dl/g, alternatively from 1.00 to 2.00 dl/g, alternatively from 1.10 to 1.80 dl/g; or vi) a molecular weight distribution Mw/Mn from 1.5 to 3.5, alternatively from 1.8 to 3.0, alternatively from 2.0 to 2.8; or vii) a density from 0.840 to 0.880 g/cm$^3$, alternatively from 0.850 to 0.870 g/cm$^3$, alternatively from 0.855 to 0.865 g/cm$^3$; or viii) Shore A value lower than 90, alternatively lower than 50, measured on compression-molded plaques according to the method ISO 868, wherein the amounts of (I) and (II) are based on the total weight of (I)+(II).

In some embodiments, the polyolefin composition has at least one of the following properties:

a melt flow rate MFR(tot) measured according to ISO 1133, 230° C., 2.16 kg ranging from 0.2 to 2.0 g/10 min.; or the total xylene soluble fraction has an intrinsic viscosity XSIV(tot) at 25° C. ranging from 2.0 to 4.0 dl/g.

In some embodiments, the polyolefin composition has MFR(tot) and XSIV(tot) values are in the ranges above.

In some embodiments, the polyolefin composition has at least one of the following properties, measured on 1 mm-thick extruded sheets:

a tear resistance in MD or TD, alternatively in MD and TD, determined according to the method ASTM D 1004 (Crosshead speed: 51 mm/min; V-shaped die cut specimen), equal to or greater than 50 N, alternatively in the range 50-70 N; or tensile strength at break equal to or greater than 15.0 MPa in MD or TD, alternatively in MD and TD, determined according to the method ISO527-3 (Specimens type: 5, Crosshead speed: 500 mm/min); or Shore A (15 sec) lower than or equal to 85, alternatively 70-85, measured according to method ISO 868 (15 sec); or Shore D (15 sec) lower than or equal to 30, alternatively 23-30, measured according to method ISO 868 (15 sec); or puncture resistance equal to or greater than 200 N, alternatively 200-250 N, measured according to method ASTM D 4833 (punch diameter: 8 mm, crosshead speed: 300 mm/min); or puncture deformation equal to or greater than 50 mm, alternatively 50-60 mm, measured according to method ASTM D 4833 (punch diameter: 8 mm, crosshead speed: 300 mm/min). In some embodiments, the strength at break in MD or TD, alternatively in MD and TD, is in the range 15.0-18.0 MPa.

In some embodiments, the polyolefin composition has the properties above measured on 1 mm-thick extruded sheet.

In some embodiments, the polyolefin composition is an additive-containing polyolefin composition (AC) made from or containing a total amount of up to 0.5% by weight, alternatively from 0.01 to 0.5% by weight, alternatively from 0.01 to 0.3% by weight, of a first additive (III), based on the total weight of the additive-containing polyolefin composition (AC). In some embodiments, the first additive (III) is selected from the group consisting of antistatic agents, anti-oxidants, antiacids, melt stabilizers, nucleating agents, and combinations thereof.

In some embodiments, a compounded polyolefin composition (CC) is made from or containing the polyolefin composition, optionally made from or containing the first additive (III), compounded with a second additive (IV). In some embodiments, the compounded polyolefin composition (CC) is made from or containing the additive-containing polyolefin composition (AC) compounded with a second additive (IV)

In some embodiments, the compounded polyolefin composition (CC) is made from or containing:

(a) at least 50% by weight, alternatively 50-99.5% by weight, alternatively 60-99% by weight, alternatively 30-99% by weight, of the polyolefin composition or the additive-containing polyolefin composition (AC); and (b) up to 50% by weight, alternatively 0.05-50% by weight, alternatively 1-40% by weight, alternatively 1-30% by weight, of the second additive (IV) selected from the group consisting of fillers, pigments, dyes, extension oils, flame retardants, UV resistants, UV stabilizers, lubricants, antiblocking agents, slip agents, waxes, coupling agents for fillers, and combinations thereof, wherein the amounts of (a) and (b) are based the total weight of (a)+(b). In some embodiments, the flame retardants are aluminum trihydrate. In some embodiments, the UV resistant are titanium dioxide. In some embodiments, the lubricants are oleamide.

In some embodiments, the compounded polyolefin composition (CC) consists of component (a) and component (b).

In some embodiments, the polyolefin composition is obtained by mechanically blending component (I) and component (II), and optionally the additives. In some embodiments, the polyolefin composition is obtained by mechanically blending component (I) and component (II), and optionally the additives, in the molten state using an extruder. In some embodiments, the extruder is a twin-screw extruder.

In some embodiments, the present disclosure provide a method for preparing a heterophasic polyolefin composition (I) made from or containing a propylene polymer (A) and a copolymer of propylene (B), including the step of adding 5-50% by weight, alternatively 5-35% by weight, alternatively 7-25% by weight, of a propylene-ethylene copolymer (II) having 12-25% by weight, alternatively 15-20% by weight, of units deriving from ethylene, based on the weight of the propylene-ethylene copolymer, to the heterophasic polyolefin composition (I). In some embodiments, the adding step includes melt blending the heterophasic polyolefin composition (I) and the propylene-ethylene copolymer (II).

In some embodiments, the heterophasic polyolefin composition (I) or the propylene-ethylene copolymer (II) are as described above. In some embodiments, the heterophasic polyolefin composition (I) and the propylene-ethylene copolymer (II) are as described above.

In some embodiments, the present disclosure provides a sheet or membrane made from or containing the polyolefin composition, the additive-containing polyolefin composition (AC), or the compounded polyolefin composition (CC).

In some embodiments, the sheet or membrane has total thickness in the range from 1000 to 2000 μm, alternatively from 1200 to 1800 μm.

In some embodiments, the sheet or membrane is a monolayer or a multilayer sheet or membrane.

In some embodiments, the sheet or membrane is a monolayer sheet or membrane made from or containing the polyolefin composition, the additive-containing polyolefin composition (AC), or the compounded polyolefin composition (CC).

In some embodiments, the sheet or membrane is a multilayer sheet or membrane having a layer X, wherein the layer X is made from or containing the polyolefin composition, the additive-containing polyolefin composition (AC), or the compounded polyolefin composition (CC). In some embodiments, the layer X consists of the polyolefin composition, the additive-containing polyolefin composition (AC), or the compounded polyolefin composition (CC).

In some embodiments, the multilayer sheet or membrane is made from or containing a layer X and a layer Y, wherein the layer X and the layer Y are made from or containing the polyolefin composition, the additive-containing polyolefin composition (AC), or the compounded polyolefin composition (CC). In some embodiments, the layer X or the layer Y consist of the polyolefin composition, the additive-containing polyolefin composition (AC), or the compounded polyolefin composition (CC). In some embodiments, both the layer X and the layer Y consists of the polyolefin composition, the additive-containing polyolefin composition (AC), or the compounded polyolefin composition (CC).

In some embodiments, the multilayer sheet or membrane is made from or containing layers X, Y and Z and has layers structure X/Z/Y, wherein the layer X and the layer Y are made from or containing the polyolefin composition, the additive-containing polyolefin composition (AC), or the compounded polyolefin composition (CC), and the layer Z is a reinforcing layer made from or containing a plastic material selected from the group consisting of propylene homopolymers, propylene copolymers, polyethylene, polyethylene terephthalate, and combinations thereof. In some embodiments, the layer X and the layer Y consist of the polyolefin composition, the additive-containing polyolefin composition (AC), or the compounded polyolefin composition (CC).

In some embodiments, the layer Z is a woven fabric or a non-woven fabric.

In some embodiment, the monolayer sheets or membranes are obtainable by calendaring, extrusion, or spread coating. In some embodiments, the sheet or membrane is obtained by extrusion.

In some embodiments, multilayer sheets or membranes are obtainable by co-extrusion of the layers or by lamination of the layers.

In some embodiments, the sheet or membrane is a single-ply roofing sheet or membrane.

In some embodiments, the sheet or membrane is a geomembrane.

The features describing the subject matter of the present disclosure are not inextricably linked to each other. In some embodiments, a level of a feature does not involve the same level of the remaining features of the same or different components. In some embodiments, a range of features of components (I) to (IV) is combined with any range of one or more of the features of components (I) to IV) and with any additional component and its features.

EXAMPLES

The following examples are illustrative and not intended to limit the scope of the disclosure in any manner whatsoever.

Characterization Methods

The following methods are used to determine the properties indicated in the description, claims and examples.

Melt Flow Rate: Determined according to the method ISO 1133 (230° C., 2.16 kg).

Solubility in xylene at 25° C.: 2.5 g of polymer sample and 250 ml of xylene were introduced into a glass flask equipped with a refrigerator and a magnetic stirrer. The temperature was raised in 30 minutes up to 135° C. The resulting clear solution was kept under reflux and stirred for further 30 minutes. The solution was cooled in two stages. In the first stage, the temperature was lowered to 100° C. in air for 10 to 15 minute under stirring. In the second stage, the flask was transferred to a thermostatically-controlled water bath at 25° C. for 30 minutes. The temperature was lowered to 25° C. without stirring during the first 20 minutes and maintained at 25° C. with stirring for the last 10 minutes. The formed solid was filtered on quick filtering paper (for example, Whatman filtering paper grade 4 or 541). 100 ml of the filtered solution (S1) was poured into a pre-weighed aluminum container, which was heated to 140° C. on a heating plate under nitrogen flow, thereby removing the solvent by evaporation. The container was then kept in an oven at 80° C. under vacuum until constant weight was reached. The amount of polymer soluble in xylene at 25° C. was then calculated. XS(I) and $XS_A$ values were experimentally determined. The fraction of component (B) soluble in xylene at 25° C. ($XS_B$) was calculated from the formula:

$$XS=W(A)\times(XS_A)+W(B)\times(XSa)$$

wherein W(A) and W(B) are the relative amounts of components (A) and (B), respectively, and W(A)+W(B)=1.

Intrinsic viscosity of the xylene soluble fraction: to calculate the value of the intrinsic viscosity IV, the flow time of a polymer solution was compared with the flow time of the solvent tetrahydronaphthalene (THN). A glass capillary viscometer of Ubbelohde type was used. The oven temperature was adjusted to 135° C. Before starting the measurement of the solvent flow time to, the temperature was stable (135°±0.2° C.). Sample meniscus detection for the viscometer was performed by a photoelectric device.

Sample preparation: 100 ml of the filtered solution (S1) was poured into a beaker and 200 ml of acetone were added under vigorous stirring. Precipitation of insoluble fraction was complete as evidenced by a clear solid-solution separation. The suspension was filtered on a weighed metallic screen (200 mesh). The beaker was rinsed. The precipitate was washed with acetone, thereby removing the o-xylene. The precipitate was dried in a vacuum oven at 70° C. until a constant weight was reached. 0.05 g of precipitate were dissolved in 50 ml of tetrahydronaphthalene (THN) at a temperature of 135° C. The efflux time t of the sample solution was measured and converted into a value of intrinsic viscosity [η] using Huggins' equation (Huggins, M. L., J. Am. Chem. Soc. 1942, 64, 11, 2716-2718) and the following data:

- concentration (g/dl) of the sample;
- the density of the solvent at a temperature of 135° C.;
- the flow time t0 of the solvent at a temperature of 135° C. on the same viscometer.

A single polymer solution was used to determine [η].

Comonomer content of the heterophasic polyolefin composition (I): determined by IR using Fourier Transform Infrared Spectrometer (FTIR). The spectrum of a pressed film of the polymer was recorded in absorbance vs. wavenumbers ($cm^{-1}$). The following measurements were used to calculate ethylene and hexene-1 content:

- Area (At) of the combination absorption bands between 4482 and 3950 $cm^{-1}$, was used for spectrometric normalization of film thickness;
- a linear baseline was subtracted in the range 790-660 $cm^{-1}$ and the remaining constant offset was eliminated; and
- the contents of ethylene and hexene-1 were obtained by applying a Partial Least Square (PLS1) multivariate regression to the 762-688 $cm^{-1}$ range.

The method was calibrated by using polymer standards based on $^{13}C$ NMR analyses. Sample preparation: Using a hydraulic press, a thick sheet was obtained by pressing about 1 g of sample between two aluminum foils. Pressing temperature was 180±10° C. (356° F.) and about 10 $kg/cm^2$ pressure was applied for about one minute (minimum two pressing operations for each specimen). A small portion was cut from the sheet to mold a film. The film thickness was between 0.02-0.05 cm.

C2 content in propylene-ethylene copolymer (II): $^{13}C$ NMR spectra were acquired on a Bruker AV-600 spectrometer equipped with cryoprobe, operating at 160.91 MHz in the Fourier transform mode at 120° C. The peak of the $P_{\beta\beta}$ carbon (nomenclature according to C. J. Carman, R. A. Harrington and C. E. Wilkes, *Macromolecules,* 10, 3, 536 (1977)) was used as internal standard at 2.8 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD, thereby removing $^{1}H$-$^{13}C$ coupling. 512 transients were stored in 32 K data points using a spectral window of 9000 Hz. The assignments of the spectra, the evaluation of triad distribution and the composition were made according to Kakugo [M. Kakugo, Y. Naito, K. Mizunuma and T. Miyatake, *Macromolecules,* 15, 4, 1150-1152 (1982)]. In view of the amount of propylene inserted as regioirregular units, ethylene content was calculated according to Kakugo [M. Kakugo, Y. Naito, K. Mizunuma and T. Miyatake, *Macromolecules,* 15, 4, 1150-1152 (1982)] using triad sequences with P inserted as regular unit.

$$PPP=100\ T_{\beta\beta}/S$$

$$PPE=100\ T_{\beta\beta}/S$$

$$EPE=100\ T_{\delta\delta}S$$

$$PEP=100\ S_{\beta\beta}/S$$

$$PEE=100\ S_{\beta\delta}/S$$

$$EEE=100\ (0.25\ S_{\gamma\delta}+0.5\ S_{\delta\delta})/S$$

where $S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$ Density: Determined according to the ISO 1183-1:2019.

Molecular weight distribution Mw/Mn of propylene-ethylene copolymer (II): Molecular weights and molecular weight distribution were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB), and the flow rate was kept at 1.0 ml/min. The sample solution was prepared by heating the sample under stirring at 150° C. in TCB for one to two hours. The concentration was 1 mg/ml. To prevent degradation, 0.1 g/1 of 2,6-ditert-butyl-p-cresol were added. 300 μl (nominal value) of solution were injected into the column set. A calibration curve was obtained using 10 polystyrene standard samples (EasiCal kit by Agilent) with molecular weights in the range from 580 to 7500000. The K values of the Mark-Houwink relationship were assumed as:

$$K=1.21\times10^{-4}\text{dl/g and}$$

$$\alpha=0.706\text{ for the polystyrene standards,}$$

A third order polynomial fit was used for interpolating the experimental data and obtain the calibration curve. Data acquisition and processing was done by using Waters Empowers 3 Chromatography Data Software with GPC option. For ethylene/propylene copolymers and for each sample, the composition was assumed constant in the whole range of molecular weight and the K value of the Mark-Houwink relationship was calculated using a linear combination as reported below:

$$K_{PE} = X_P K_{PP} + X_E K_{PE}$$

where $K_{PE}$ is the constant of the copolymers, $K_{PP}$ ($1.90\times10^{-4}$ dl/g) and $K_{PE}$ ($4.06\times10^{-4}$ dl/g) are the constants of polypropylene (PP) and polyethylene (PE), XP and XE are the propylene and ethylene weight relative amount with $X_P+X_E=1$. The Mark-Houwink exponents $\alpha=0.725$ was used for the samples.

Preparation of injection molded specimens: test specimens 80×10×4 mm were obtained according to the method ISO 1873-2:2007.

Preparation of extruded specimens: the polymer, in form of granules, was fed via feed hoppers into a Leonard extruder (mono-screw extruder, 40 mm in diameter and 27 L/D in length), wherein the polymer was melted (melt temperature 230° C.), compressed, mixed, and metered out at a throughput rate of 10 Kg/h with a metering pump (15 cc/rpm). The molten polymer left the flat die (width 200 mm, die lip at 0.8-0.9 mm) and was instantly cooled through a vertical three-rolls calender having roll-temperature of 60° C. 1 mm-thick extruded sheets were obtained.

Preparation of compression molded plaques: obtained according to ISO 8986-2:2009.

Flexural modulus: Determined according to the method ISO 178:2019 on injection-molded test specimens.

Strength and Elongation at break: Determined according to the method ISO 527 on injection-molded test specimens.

Vicat softening temperature: Determined according to the method ISO 306:2013 (A50) on injection-molded specimens.

Charpy Impact test at −40° C.: measured according to ISO 179-1:2010 on injection-molded specimens.

Tensile Modulus (MD and TD): Determined according to the method ISO 527-3:2018 on 1 mm-thick extruded sheets. Specimens type 2, Crosshead speed: 1 mm/min.

Tensile strength and elongation at break (MD and TD) on extruded sheets: Determined according to the method ISO527-3. Specimens type: 5, Crosshead speed: 500 mm/min.

Tear resistance: Determined according to the method ASTM D 1004 on 1 mm-thick extruded sheets. Crosshead speed: 51 mm/min; V-shaped die cut specimen.

Puncture resistance and deformation: Determined according to the method ASTM D 4833 on 1 mm-thick extruded sheets. Punch diameter 8 mm, crosshead speed: 300 mm/min.

Shore A and D on injection-molded, compression-molded plaques and extruded sheets: Determined according to the method ISO 868 (15 sec).

HECO1 and HECO2: The heterophasic polyolefin composition HECO1 and HECO2 were prepared by polymerization in two gas phase reactors, connected in series and equipped with devices to transfer the product from the first to the second reactor. For the polymerization, a Ziegler-Natta catalyst system was used made from or containing:

- a titanium-containing solid catalyst component prepared with as described in European Patent Application No. EP395083, Example 3, according to which di-isobutyl phthalate was used as internal electron donor compound;
- triethylaluminium (TEAL) as co-catalyst; and
- Dicyclopentyl dimethoxy silane (DCPMS) as external electron donor.

The solid catalyst component was contacted with TEAL and DCPMS in a pre-contacting vessel, with a weight ratio of TEAL to the solid catalyst component of 4-5. The weight ratio TEAL/DCPMS (T/D) is reported in Table 1.

The catalyst system was then subjected to pre-polymerization by suspending the catalyst system in liquid propylene at 20° C. for about 30-32 minutes before introducing the catalyst system into the first polymerization reactor.

Propylene copolymer (A) was produced into the first gas phase reactor by feeding, in a continuous and constant flow, the pre-polymerized catalyst system, hydrogen (used as molecular weight regulator), propylene, and comonomer (hexene-1 or ethylene), in gaseous phase.

The propylene copolymer (A) coming from the first reactor was discharged in a continuous flow and, after having been purged of unreacted monomers, was introduced, in a continuous flow, into the second gas phase reactor, together with quantitatively constant flows of propylene, ethylene, and hydrogen, in the gas state. In the second reactor, the propylene copolymer (B) was produced.

Polymerization conditions, molar ratio of the reactants, and composition of the copolymers obtained are shown in Table 1.

TABLE 1 polymerization conditions

| | | HECO1 | HECO2 |
|---|---|---|---|
| GPR1 | | | |
| T/D | | 10 | 5 |
| Temperature | ° C. | 60 | 70 |
| Pressure | barg | 16 | 18 |
| $H_2/C_3$- | mol. | 0.066 | 0.10 |
| $C_6$-/($C_6$- + $C_3$-) | mol | 0.034 | / |
| $C_2$-/($C_2$- + $C_3$-) | mol | / | 0.01 |
| Split | wt % | 21 | 31 |
| Xylene soluble of A ($XS_A$) | wt % | 6.2 | 5.5 |
| MFR of A ($MFR_A$) | g/10 min. | 30.3 | 25 |
| $C_6$- content of A | wt % | 3.8 | / |
| $C_2$- content of A | wt % | / | 3.2 |
| GPR2 | | | |
| Temperature | ° C. | 55 | 60 |
| Pressure | barg | 16 | 18 |
| $H_2/C_2$- | mol. | 0.065 | 0.09 |
| $C_2$-/($C_2$- + $C_3$-) | mol. | 0.146 | 0.16 |
| Split | wt % | 79 | 69 |
| $C_2$- content of B * | wt % | 28 | 27 |
| $C_2$- content of (A + B) | wt % | 21.7 | 19.4 |
| MFR(I) | g/10 min | 0.33 | 0.61 |
| XSIV(I) | dl/g | 3.79 | 3.18 |
| XS(I) | % | 72.9 | 63.6 |

Notes:
$C_2$- = ethylene in gas phase (IR);
$C_3$- = propylene in gas phase (IR);
$C_6$- = hexene-1 in gas phase (IR);
split = amount of polymer produced in the concerned reactor.
* Calculated values.

The polymer particles exiting the second reactor were subjected to a steam treatment, thereby removing the unreacted monomers and volatile compounds, and then dried.

Properties of HECO1 and HECO2 tested on injection molded specimens are reported in Table 2.

TABLE 2 characterization of HECO1 and HECO2

| | | HECO1 | HECO2 |
|---|---|---|---|
| Flexural Modulus | MPa | 70 | 99 |
| Strength at break | MPa | 10.2 | 10.5 |

TABLE 2-continued

| characterization of HECO1 and HECO2 | | | |
|---|---|---|---|
| | | HECO1 | HECO2 |
| Elongation at break | % | 390 | 400 |
| Vicat temperature (9.81N) | ° C. | 55 | 62 |
| Charpy Resistance −40° C. | KJ/m² | 7 | 5.2 |

Comparative Example CE1 and Examples E2-E3

In a co-rotating twin screw extruder Berstorff ZE25, HECO1, as obtained from the reactor, was melt blended with a propylene-ethylene elastomer (POE) and additives. The blend was extruded under nitrogen atmosphere in the following conditions: Rotation speed of 250 rpm; Extruder output of 15 kg/hour; Melt temperature of 270° C.

The POE had 19% of units deriving from ethylene and the following characteristics: XSIV(II) of 1.68 dl/g; Mw/Mn of 2.3; density of 0.8575 g/cm$^3$; MFR(II) (230°/2.16 Kg) of 2.4 g/10 min.; and Shore A value (15 sec) of 43 measured in compression-molded specimens.

The relative amounts of components (I) and (II) and of the additives, as well as the properties of the compositions measured on extruded sheets are reported in Table 3.

TABLE 3

| | | CE1 | E2 | E3 |
|---|---|---|---|---|
| HECO1 | wt. % | 99.8 | 89.8 | 79.8 |
| POE | wt. % | — | 10 | 20 |
| Irg. 1010 | wt. % | 0.05 | 0.05 | 0.05 |
| Irg. 168 | wt. % | 0.1 | 0.1 | 0.1 |
| Ca stearate | wt. % | 0.05 | 0.05 | 0.05 |
| MFR(tot) | g/10 min | — | 0.78 | 0.69 |
| XSIV(tot) | dl/g | — | 2.77 | 2.80 |
| XS(tot) | % | — | 73.2 | 77.3 |
| MD | | | | |
| Tensile modulus | MPa | 82 | 83 | 67 |
| Tensile strength at break | MPa | 16.5 | 16.3 | 16.3 |
| Elongation at break | % | 630 | 670 | 680 |
| Tear resistance | N | 64 | 67 | 66 |
| TD | | | | |
| Tensile modulus | MPa | 48 | 43 | 29 |
| Tensile strength at break | MPa | 15.5 | 18.6 | 16.3 |
| Elongation at break | % | 656 | 700 | 680 |
| Tear resistance | N | 59 | 58 | 82 |
| Shore A (15 sec) | | 89 | 84 | 82 |
| Shore D (15 sec) | | 31 | 27 | 25 |
| Puncture resistance | N | 210 | 234 | 213 |
| Puncture deformation | mm | 45 | 52 | 53 |

Irganox® 1010 was 2,2-bis[3-[,5-bis(1,1-dimethyl ethyl)-4-hydroxyphenyl]-1-oxoprop oxy]methyl]-1,3-propanediyl-3,5-bis(1,1-dimethylethyl)-4-hydroxybenzene-propanoate; Irgafos® 168 was tris(2,4-di-tert-butylphenyl)phosphite.

Comparative Examples CE4-CE6

As obtained from the reactor, HECO1 was melt blended with Vistamaxx® 3020 POE, which was commercially available from ExxonMobil and had 11 wt. % of C2, a MFR (230°/2.16 Kg) of 3 g/10 min., a density of 0.874 g/cm$^3$, and a Shore D value of 29. The polyolefin compositions, including the additives, were extruded in the same conditions of comparative example CE1.

The formulations of the polyolefin compositions are reported in Table 4. The properties of the compositions measured on extruded sheets are reported in Table 5.

TABLE 4

| | | CE4 | CE5 | CE6 |
|---|---|---|---|---|
| HECO1 | wt. % | 99.75 | 89.75 | 79.75 |
| Vistamaxx ® 3020 | wt. % | — | 10 | 20 |
| Irg. 1010 | wt. % | 0.1 | 0.1 | 0.1 |
| Irg. 168 | wt. % | 0.1 | 0.1 | 0.1 |
| Ca stearate | wt. % | 0.05 | 0.05 | 0.05 |
| MFR(tot) | g/10 min | — | 0.46 | 0.57 |
| XSIV(tot) | dl/g | — | 3.23 | 2.81 |
| XS(tot) | % | — | 74.1 | 76.1 |

TABLE 5

| | | CE4 | CE5 | CE6 |
|---|---|---|---|---|
| MD | | | | |
| Tensile modulus | MPa | 80 | 79 | 69 |
| Tensile strength at break | MPa | 17.7 | 21.6 | 20.0 |
| Elongation at break | % | 650 | 700 | 670 |
| Tear resistance | N | 74 | 76 | 73 |
| TD | | | | |
| Tensile modulus | MPa | 60 | 52 | 58 |
| Tensile strength at break | MPa | 16.9 | 21.1 | 23.8 |
| Elongation at break | % | 690 | 740 | 730 |
| Tear resistance | N | 72 | 83 | 70 |
| Shore A (15 sec) | | 89 | 90 | 90 |
| Shore D (15 sec) | | 30 | 31 | 31 |
| Puncture resistance | N | 244 | 247 | 250 |
| Puncture deformation | Mm | 50 | 49 | 50 |

Irganox® 1010 was 2,2-bis[3-[,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate; Irgafos® 168 was tris(2,4-di-tert-butylphenyl)phosphite.

Comparative Examples CE7 and CE10 and Examples E8-E9

As obtained from the reactor, HECO2 was melt blended with the POE used in example E2 or with a C2/C8 elastomer (under the tradename Engage™ 8150, which was commercially available from The Dow Chemical Company) having a melt index (190°/2.16 Kg) of 0.5 g/10 min. (ASTM D1238), a density of 0.868 g/cm$^3$ (ASTM D792), and a Shore D value of 20 (1 sec, on compression-molded plaques, ADTM D2240). The polyolefin compositions including the additives were extruded in the same conditions of comparative example CE1. The formulations of the polyolefin compositions are reported in Table 6. Table 7 reports the properties of the compositions measured on extruded sheets.

TABLE 6

| | | CE7 | E8 | E9 | CE10 |
|---|---|---|---|---|---|
| HECO2 | wt. % | 99.75 | 79.75 | 49.75 | 49.75 |
| POE | wt. % | — | 20 | 50 | — |
| C2/C8 elastomer | wt. % | — | — | — | 50 |
| Irg. 1010 | wt. % | 0.1 | 0.1 | 0.1 | 0.1 |
| Irg. 168 | wt. % | 0.1 | 0.1 | 0.1 | 0.1 |
| Ca stearate | wt. % | 0.05 | 0.05 | 0.05 | 0.05 |

TABLE 7

| | | CE7 | E8 | E9 | CE10 |
|---|---|---|---|---|---|
| MD | | | | | |
| Tensile strength at break | MPa | 19.5 | 22.2 | 16.2 | 23.6 |
| Elongation at break | % | 750 | 920 | 900 | 720 |
| Tear resistance | N | 71 | 68 | 47 | 61 |
| Shore A (15 sec) | | >90 | 84 | 71 | 82 |
| Shore D (15 sec) | | 34 | 28 | 17 | 27 |

Irganox® 1010 was 2,2-bis[3-[,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate; Irgafos® 168 was tris(2,4-di-tert-butylphenyl)phosphite.

What is claimed is:

1. A polyolefin composition comprising:

(I) 50-95% by weight of a heterophasic polyolefin composition comprising:

(A) 10-40% by weight of a propylene polymer selected from the group consisting of propylene homopolymers and copolymers of propylene with an alpha-olefin of formula $CH_2$=CHR, where R is H or a linear or branched C2-C8 alkyl, comprising 1.0-6.0% by weight of units deriving from the alpha-olefin, based on the weight of the propylene polymer (A), wherein the propylene polymer (A) having a melt flow rate ($MFR_A$) measured according to ISO 1133, 230° C., 2.16 kg ranging from 20 to 60 g/10 min; and (B) 60-90% by weight of a copolymer of propylene with an alpha-olefin of formula $CH_2$=CHR, and optionally a diene, where R is H or a linear or branched C2-C8 alkyl and comprises 20-35% by weight of units deriving from the alpha-olefin, based on the weight of the propylene copolymer (B), wherein the fraction of the heterophasic polyolefin composition (I) soluble in xylene at 25° C. (XS(I)) is equal to or higher than 60% by weight, the amounts of (A), (B) and XS(I) being based on the total weight of (A)+ (B); and (II) 5-50% by weight of a propylene-ethylene copolymer comprising 12-25% by weight of units deriving from ethylene, based on the weight of the propylene-ethylene copolymer (II), wherein the amounts of (I) and (II) are based on the total weight of (I)+ (II).

2. The polyolefin composition of claim 1, wherein the propylene polymer (A) comprises 2.0-5.0% by weight of units deriving from the alpha-olefin, based on the weight of the propylene polymer (A).

3. The polyolefin composition of claim 1, wherein the propylene polymer (A) has a melt flow rate ($MFR_A$) measured according to ISO 1133, 230° C., 2.16 kg ranging from 25 to 55 g/10 min.

4. The polyolefin composition according to claim 1, wherein the fraction of the heterophasic polyolefin composition (I) soluble in xylene at 25° C. (XS(I)) is higher than 65% by weight, based on the total weight of (A)+ (B).

5. The polyolefin composition according to claim 1, wherein the fraction of the heterophasic polyolefin composition (I) soluble in xylene at 25° C. has an intrinsic viscosity XSIV(I) ranging from 2.0 to 5.5 dl/g.

6. The polyolefin composition according to claim 1, wherein the alpha-olefin of propylene copolymer (B) is selected from the group consisting of ethylene, butene-1, hexene-1, 4-methyl-pentene-1-octene-1, and combinations thereof.

7. The polyolefin composition according to claim 1, wherein the propylene-ethylene copolymer (II) is a polyolefin elastomer having at least one of the following properties:

a fraction soluble in xylene at 25° C. greater than 97% by weight, based on the weight of component (II); or an intrinsic viscosity XSIV(II) of the fraction soluble in xylene at 25° C. lower than 2.00 dl/g; or a molecular weight distribution Mw/Mn from 1.5 to 3.5; or a density from 0.840 to 0.880 g/$cm^3$; or Shore A value lower than 90, measured on compression-molded plaques according to the method ISO 868.

8. The polyolefin composition according to claim 1, comprising:

(I) 50-95% by weight of a heterophasic polyolefin composition comprising:

(A) 10-40% by weight of a copolymer of propylene with hexene-1 comprising 1.0-6.0% by weight of units deriving from hexene-1, based on the weight of the propylene polymer (A), and having a melt flow rate ($MFR_A$) measured according to ISO 1133, 230° C., 2.16 kg ranging from 20 to 60 g/10 min; and (B) 60-90% by weight of a copolymer of propylene with ethylene comprising 20-35% by weight of units deriving from ethylene, based on the total weight of the propylene copolymer (B), wherein i) the fraction of the heterophasic polyolefin composition (I) soluble in xylene at 25° C. (XS(I)) is higher than 65% by weight;

ii) the amounts of (A), (B), and XS(I) are based on the total weight of (A)+ (B); and iii) the melt flow rate (MFR (I)) measured according to ISO 1133, 230° C., 2.16 kg of the heterophasic polyolefin composition (I) ranges from 0.2 to 6.0 g/10 min;

and (II) 5-50% by weight of a propylene-ethylene copolymer comprising 12-25% by weight of units deriving from ethylene, based on the weight of the propylene-ethylene copolymer (II), wherein the propylene-ethylene copolymer has:

iv) a fraction soluble in xylene at 25° C. greater than 97% by weight, based on the weight of component (II); or iv) the fraction soluble in xylene at 25° C. has an intrinsic viscosity XSIV(II) lower than 2.00 dl/g or vi) a molecular weight distribution Mw/Mn from 1.5 to 3.5; or vii) a density from 0.840 to 0.880 g/$cm^3$; or viii) Shore A value lower than 90, measured on compression-molded plaques according to the method ISO 868, wherein the amounts of (I) and (II) are based on the total weight of (I)+(II).

9. A method for preparing a heterophasic polyolefin composition (I) comprising a propylene polymer (A) and a copolymer of propylene (B), comprising the step of:

adding 5-50% by weight of a propylene-ethylene copolymer (II) comprising 12-25% by weight of units deriving from ethylene, based on the weight of the propylene-ethylene copolymer, to the heterophasic polyolefin composition (I).

10. A sheet or membrane comprising the polyolefin composition according to claim 1.

11. The sheet or membrane according to claim 10 comprising layers X, Y and Z and having layers structure X/Z/Y, wherein the layer X and the layer Y comprise the polyolefin composition, and the layer Z is a reinforcing layer comprising a plastic material selected from the group consisting of propylene polymers, polyethylene, polyethylene terephthalate, and combinations thereof.

12. The sheet or membrane according to claim 10, wherein the sheet or membrane is in the form of a single-ply roofing sheet or membrane.

13. The sheet or membrane according to claim 10, wherein the sheet or membrane is in the form of a geomembrane.

* * * * *